(12) United States Patent
Guo et al.

(10) Patent No.: US 8,009,671 B2
(45) Date of Patent: Aug. 30, 2011

(54) MULTICAST METHOD AND MULTICAST ROUTING METHOD

(75) Inventors: Feng Guo, Shenzhen (CN); Yi Xiong, Shenzhen (CN); Weisi Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 61 days.

(21) Appl. No.: 12/267,296

(22) Filed: Nov. 7, 2008

(65) Prior Publication Data

US 2009/0059923 A1    Mar. 5, 2009

Related U.S. Application Data

(63) Continuation of application No. PCT/CN2008/070187, filed on Jan. 25, 2008.

(30) Foreign Application Priority Data

Feb. 5, 2007   (CN) .......................... 2007 1 0003486

(51) Int. Cl.
    H04L 12/56    (2006.01)
(52) U.S. Cl. .......................... 370/390; 370/389; 370/432
(58) Field of Classification Search .................. 370/389, 370/254, 255, 256
    See application file for complete search history.

(56) References Cited

U.S. PATENT DOCUMENTS

| | | | | |
|---|---|---|---|---|
| 6,728,777 | B1* | 4/2004 | Lee et al. ........................ | 709/238 |
| 7,529,199 | B1* | 5/2009 | Wijnands et al. ............. | 370/256 |
| 2003/0109216 | A1* | 6/2003 | Kim et al. ..................... | 455/3.01 |
| 2005/0097219 | A1 | 5/2005 | Goguen et al. | |
| 2006/0221958 | A1* | 10/2006 | Wijnands et al. ............. | 370/389 |
| 2007/0127502 | A1* | 6/2007 | Zhu ................................ | 370/397 |
| 2007/0147371 | A1* | 6/2007 | Radha et al. .................. | 370/390 |
| 2007/0274235 | A1* | 11/2007 | Boers et al. ................... | 370/256 |
| 2007/0286093 | A1* | 12/2007 | Cai et al. ....................... | 370/254 |
| 2008/0008167 | A1* | 1/2008 | Ver Steeg ..................... | 370/389 |

FOREIGN PATENT DOCUMENTS

CN    1378365 A    11/2002

(Continued)

OTHER PUBLICATIONS

Vida, R. et al., "RFC-3810-Multicast Listener Discovery Version 2 (MLDv2) for IPv6," Network Working Group, Jun. 2004, The Internet Society, Geneva, Switzerland.

(Continued)

*Primary Examiner* — Dang Ton
*Assistant Examiner* — Pamit Kaur
(74) *Attorney, Agent, or Firm* — Leydig, Voit & Mayer, Ltd.

(57) ABSTRACT

A multicast method includes joining a multicast group and forwarding a multicast data packet; during joining the multicast group, establishing multicast forwarding instruction information identified by a MFEC, on a network node of a distribution tree or a distribution sub-tree to which the MFEC pertains; and during forwarding the multicast data packet, forwarding multicast data packets of the same MFEC, according to the multicast forwarding instruction information. The invention further discloses a multicast method, including: classifying a collection of multicast data packets forwarded in the same mode into a MFEC; statically configuring multicast forwarding instruction information identified by the MFEC on a network node of a distribution tree or a distribution sub-tree to which the MFEC pertains; and forwarding the multicast data packets of the same MFEC, according to the multicast forwarding instruction information. The invention further discloses a multicast routing method.

14 Claims, 4 Drawing Sheets

FOREIGN PATENT DOCUMENTS

| | | |
|---|---|---|
| CN | 1595879 A | 3/2005 |
| CN | 1881931 A | 12/2006 |
| JP | 2005-236640 A | 9/2005 |
| WO | WO 2005/039085 A2 | 4/2005 |

OTHER PUBLICATIONS

Cain, B. et al., "RFC3376-Internet Group Management Protocol, Version 3," Network Working Group, Oct. 2002, The Internet Society, Geneva, Switzerland.

Deering, S. et al., "RFC2710-Multicast Listener Discovery (MLD) for IPv6," Network Working Group, Oct. 1999, The Internet Society, Geneva, Switzerland.

Fenner, W., "RFC2236-Internet Group Management Protocol, Version 2," Network Working Group, Nov. 1997, The Internet Society, Geneva, Switzerland.

Rozie, Ivo, "Multicast State Scalability in QoS MPLS Networks," Softcom 2006-International Conference on IEEE, Sep. 1, 2009, Software in Telecommunications and Computer Networks, Croatia.

"Multicast Forwarding Equivalence Class (MFEX)," Jun. 2007, Huawei Technologies Co., Ltd., Shenzhen, China.

Oh, Y., et al., "Scalable MPLS Multicast Using Label Aggregation in Internet Broadcasting Systems," 2003, IEEE, Washington D.C., USA.

Extended European Search Report from the European Patent Office in correspondence European Patent Application No. 08706564 (Jun. 24, 2010).

Written Opinion from the International Searching Authority in corresponding PCT Application No. PCT/CN2008/070187 (Apr. 21, 2008).

* cited by examiner

MULTICAST METHOD AND MULTICAST ROUTING METHOD

CROSS-REFERENCE TO RELATED APPLICATIONS

This application is a continuation of International Patent Application No. PCT/CN2008/070187, filed Jan. 25, 2008, which claims priority to Chinese Patent Application No. 200710003486.4, filed Feb. 5, 2007, both of which are hereby incorporated by reference in their entirety.

FIELD OF INVENTION

The present disclosure relates to network routing and forwarding technologies, and, in particular, to a multicast method and a multicast routing method.

BACKGROUND OF INVENTION

The statements in this section merely provide background information related to the present disclosure and may not constitute prior art.

In the current network application, the position of multimedia services, such as video, becomes increasingly important, and the multicast technology is an important bearer technology of multicast technology for network multimedia services. The multicast is a one-to-many or many-to-many multiparty communication mode. In the multicast model as shown in FIG. 1, the path through which a video stream passes in a network forms a tree structure, the same video stream transfers on each branch of the tree, and the video stream is transferred to all the receivers by copying the video stream at the bifurcations of the tree. This tree is referred to as a distribution tree. In the multicast routing protocol, a distribution tree is formed firstly, and a video stream is transferred from a server to all the receivers by transferring the video stream on each branch of the distribution tree and copying the video stream at the bifurcations of the tree.

With the IPTV service as an example, if a user wants to watch a TV program on a channel, the user first needs to send a packet for joining a multicast group, which is referred to as a join packet for short below, to a nearest layer 3 network device, and the layer 3 network device establishes a corresponding routing forwarding state. Because the routing forwarding state can be used for instructing the forward of a protocol packet and a multicast data packet, the routing forwarding state is generally referred to as multicast forwarding instruction information. In addition, an outgoing-interface of the multicast data packet further needs to be added in the routing forwarding table item, and a join packet is sent to an upstream layer 3 network device in the direction of the multicast source server to which the TV program of the channel pertains. A similar action is performed on the upstream layer 3 network device. In other words, a routing forwarding state is established, an outgoing-interface is added to a routing forwarding table item, and then a join packet is sent to an upstream side of the upstream layer 3 network device. After the root node of the multicast data packet distribution tree receives the join packet, the layer 3 network device of the root node pushes the multicast data packet along the same distribution tree to the layer 3 network device nearest to the user.

The join packet sent by the user includes a multicast source group address pair, i.e. an address of a program of a channel, and a multicast session is identified by the multicast source group address pair. The address pair is generally represented in the form of (S,G) or (*,G), or uniformly represented by (S/*,G). The S represents an address of a designated multicast source, in other words, the S represents the IP address of the source which is sent to the multicast group G. The G represents an address of a designated multicast group for identifying the collection of all the receivers in a multipoint communication service, i.e. a multicast group. For example, all the receivers of an IPTV program belong to the same multicast group. The * represents any multicast source, that is, no multicast source is designated by the receiver. A multicast source group address pair (S/*,G) corresponds to a group of states in a layer 3 network device on the distribution tree, and the layer 3 network device on the distribution tree establishes a corresponding routing forwarding table item for the multicast source group. The message carrying the state is referred to as a protocol packet.

SUMMARY OF THE INVENTION

An object of the embodiments of the invention provides a multicast method and a multicast routing method so as to decrease the memory occupation of the router and improve the efficiency of the protocol packet.

One embodiment of the invention provides a multicast method, including joining a multicast group and forwarding a multicast data packet, and during joining the multicast group, establishing multicast forwarding instruction information identified by a Multicast Forwarding Equivalence Class (MFEC), on a network node of a distribution tree or a distribution sub-tree to which the MFEC pertains; and during forwarding the multicast data packet, forwarding multicast data packets of the same MFEC, according to the multicast forwarding instruction information.

Another embodiment of the invention further provides a multicast routing method, including: classifying a collection of multicast data packets forwarded in the same mode into an MFEC; after an egress network node of a distribution tree or a distribution sub-tree to which the MFEC pertains receives a triggering, sending a join packet to an upstream network node of the distribution tree or the distribution sub-tree, establishing multicast forwarding instruction information identified by the MFEC, and adding an outgoing-interface to the multicast forwarding instruction information; and establishing, by the upstream network node, the multicast forwarding instruction information identified by the MFEC, adding the outgoing-interface to the multicast forwarding instruction information, and sending the join packet towards upstream side until the join packet reaches an ingress network node of the distribution tree or the distribution sub-tree.

Another embodiment of the invention further provides a multicast method, including: classifying a collection of multicast data packets forwarded in the same mode into a MFEC; statically configuring multicast forwarding instruction information identified by the MFEC on a network node of a distribution tree or a distribution sub-tree to which the MFEC pertains; and forwarding the multicast data packets of the same MFEC, according to the multicast forwarding instruction information.

Another embodiment of the invention further provides an egress network node, including: a classifying module, a receiving module, a converting module, and a sending module.

The classifying module is adapted to classify a collection of multicast data packets forwarded in the same mode into a MFEC and configure a mapping relationship between the multicast data packets of the same MFEC and the MFEC.

The receiving module is adapted to output a join packet received to the converting module and output the multicast data packets received to the sending module.

The converting module is adapted to map the join packet received into a join packet based on the MFEC, according to the mapping relationship obtained from the classifying module, establish forwarding instruction information identified by the MFEC, and output the join packet mapped and the forwarding instruction information to the sending module.

The sending module is adapted to send a received join packet which is mapped to an upstream network node, and send the multicast data packets received to a downstream network node, according to the forwarding instruction information.

Another embodiment of the invention further provides an ingress network node, including: a classifying module, a receiving module, a converting module, and a sending module.

The classifying module is adapted to classify a collection of multicast data packets forwarded in the same mode into a MFEC, and configure a mapping relationship between the multicast data packets of the same MFEC and the MFEC.

The receiving module is adapted to output a join packet received to the converting module and output the multicast data packets received to the sending module.

The converting module is adapted to establish forwarding instruction information identified by the MFEC according to the join packet received and the mapping relationship obtained from the classifying module, and output the forwarding instruction information to the sending module.

The sending module is adapted to send the multicast data packets received to a downstream network node, according to the forwarding instruction information.

In the invention, by classifying a collection of multicast data packets forwarded in the same mode into a MFEC and using the same multicast forwarding instruction information for the MFECs passing through the same distribution tree or sub-tree, the memory space of the router occupied by the forwarding instruction information of different multicast data packets may be decreased, the routing convergence time may be reduced, and routing switching frequency may be decreased. Thus, the space efficiency and the time efficiency are improved.

Moreover, in the invention, the single (S,G) or (*,G) are not used as the minimum unit for the protocol packet. In other words, the join packet is not sent for each join request of different (S,G) or (*,G). Instead, the same protocol packet is used for the join requests of the same MFEC, based on the minimum unit of the MFEC. Therefore, the efficiency of state processing and packet interaction is improved.

BRIEF DESCRIPTION OF THE DRAWINGS

The disclosure will become more fully understood from the detailed description given herein below for illustration only, and thus is not limitative of the disclosure, and wherein.

DETAILED DESCRIPTION OF THE EMBODIMENTS

The following description is merely exemplary in nature and is not intended to limit the present disclosure, application, or uses.

In the embodiments of the invention, a collection of multicast data packets forwarded in the same mode is classified into a MFEC. For MFECs which pass through the same distribution tree or sub-tree, the same forwarding mode is employed and the same multicast forwarding instruction information is used. The multicast forwarding instruction information includes, but is not limited to, the same multicast routing table item and the multicast forwarding table item. Thus, the forwarding of a plurality of multicast data packets may be aggregated, the memory space of the router occupied by the multicast forwarding instruction information of different multicast groups may be decreased, the routing convergence time may be reduced, and the routing switching frequency may be decreased. Therefore, the space efficiency and time efficiency may be improved. In addition, according to the embodiments of the invention, the join packet is sent based on the MFEC, instead of the single (S,G) or (*,G). Hence, the efficiency of the state processing and packet interaction may be improved.

Figure 1:
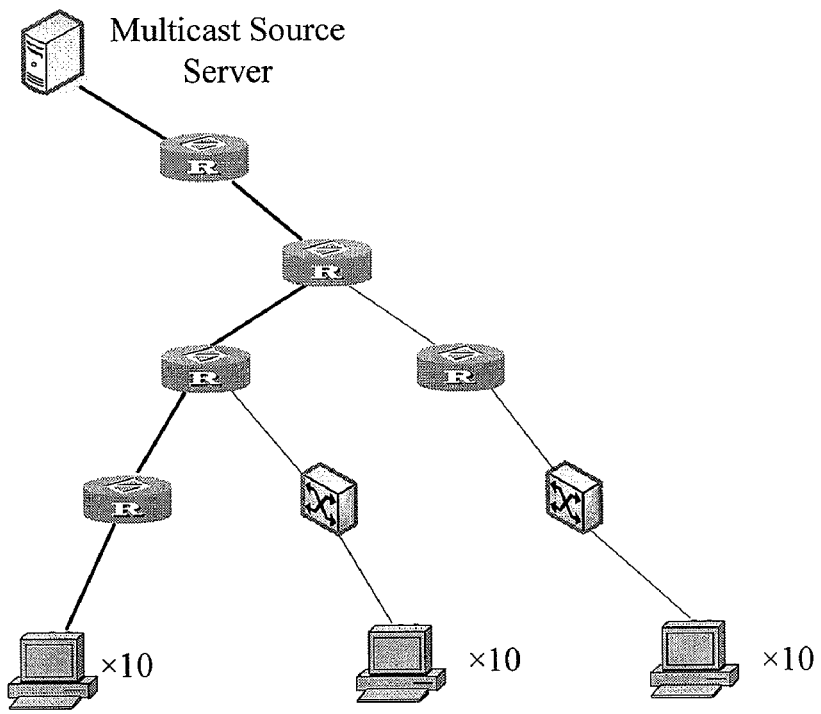
FIG. 1 is a schematic diagram of a multicast model in the related art.
Figure 2:
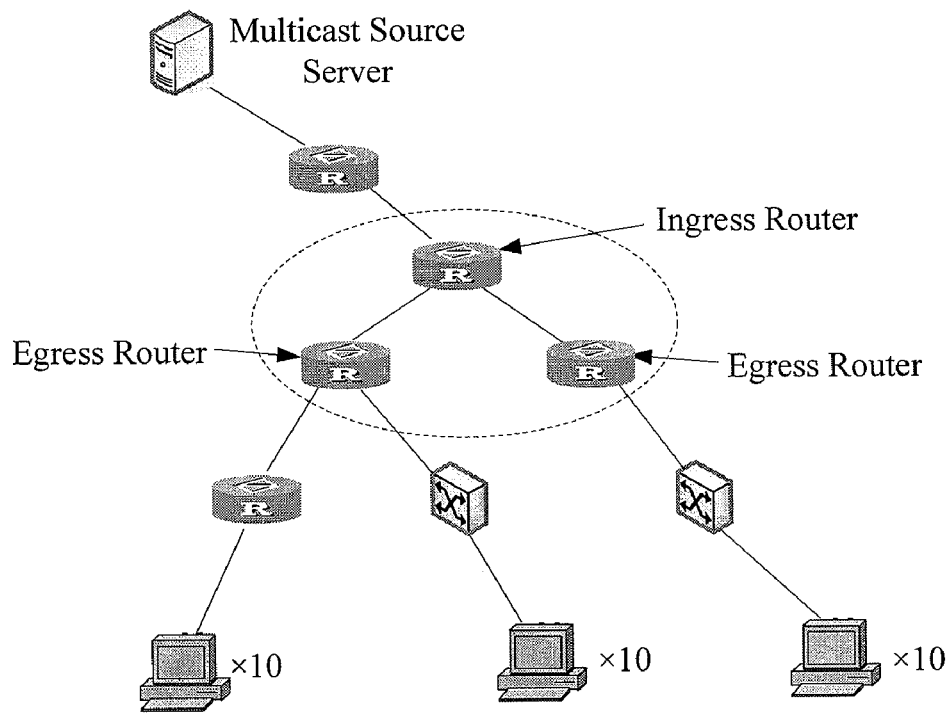
FIG. 2 is a schematic diagram of the distribution tree or distribution sub-tree based on the MFEC, according to one embodiment of the invention.

In the embodiments of the invention, a collection of multicast data packets forwarded in the same mode is classified into a MFEC, for example, a collection of data packets which pass through the same multicast distribution tree or distribution sub-tree and have the same forwarding process. With a service in IPTV as an example, the same server or server group may send the programs of a plurality of channels. These programs may be pushed to a router nearest to a receiver under the join request of the receiver. If a group of receivers receive all programs of these channels, in other words, the distribution trees corresponding to these channels are the same, all the multicast data packets pass through the same routing path and the collection of the multicast data packets is a MFEC. Similarly, the collection of multicast data packets passing through the same distribution sub-tree is also a MFEC. As shown in FIG. 2, all the multicast data packets forwarded on the routers in the ellipse are the same, and thus the multicast data packets passing through the sub-tree form a MFEC. In a Distribution tree or distribution sub-tree based on MFEC, as shown in FIG. 2, the root node is referred to as an ingress node, the leaf node is referred to as an egress node, and other nodes except for the root node and the leaf node are referred to as a transit node.

In the embodiments of the invention, the multicast source group address pair is employed to represent a MFEC; however, the multicast source group address pair is different from that in an existing protocol. The address pair can represent all the channels transmitted on the distribution tree. The representation mode of the address pair includes, but is not limited to: (multicast source address, multicast group address/mask), (multicast source address/mask, multicast group address), (multicast source address/mask, multicast group address/mask), (multicast source address, {239.1.1.1, 239.1.1.2}), (discrete multicast source address, multicast group address), (discrete multicast source address, multicast group address/mask), or (discrete multicast source address, discrete multicast group address). The multicast group address/mask represents a network segment in which all the addresses represent the multicast group addresses of all the channels included in the MFEC. Similarly, the multicast source address/mask also represents a network segment in which all the addresses represent the multicast source addresses of all the channels included in the MFEC. However, if the addresses of a plurality of multicast sources or a plurality of multicast groups are discontinuous, the addresses may also be represented in a discrete IP address mode, for example, the fourth to the seventh representation modes as stated above.

In the embodiments of the invention, the interaction of protocol packets is implemented with MFEC as the minimum unit, and the multicast data packets of the same MFEC are forwarded using the same multicast forwarding table item. Moreover, in the distribution tree or distribution sub-tree corresponding to a MFEC, because the fields in the protocol packets or packets of channels belonging to the same MFEC may be merged into one field, no corresponding state and protocol packet needs to be established for each channel. Thus, the memory space of the router is saved and the routing switching time is decreased.

Figure 3:
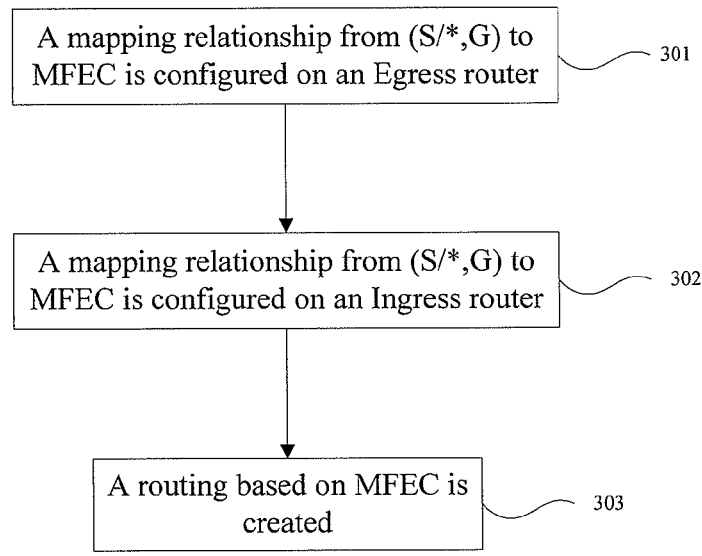
FIG. 3 is a flow chart of the multicast routing method based on MFEC, according to the first embodiment of the invention.

The first embodiment shows a multicast routing method based on MFEC. The process of the multicast routing method is as shown in FIG. 3 and includes the following steps.

Step 301: A mapping relationship from (S/*,G) to MFEC is configured on an egress router. If the (S,G/M) or (*,G/M) belongs to the same MFEC, when the egress router receives an Internet Group Management Protocol/Multicast Listener Discover (IGMP/MLD) join packet sent from a receiver host or a join packet of protocols, such as Protocol Independent Multicast (PIM) sent from other receiver hosts via other routers, the egress router maps the packet received into an IGMP/MLD report packet or join packet of corresponding (S,G/M) or (*,G/M). There are two mapping methods. The first mapping method includes replacing the (S/*,G) in the join packet with the identification of the MEFC i.e. (S,G/M) or (*,G/M). The second mapping method includes adding a MFEC ID field to the packet and broadcasting the correspondence between the MFEC and the MFEC ID over the network, or statically configuring the correspondence on each node via a command. The report packet is a join packet for joining a multicast group sent from a receiver host to a router, and the join packet is a join packet transferred between routers. The above two methods exist because the egress router may be connected with the receiver host or connected with the receiver host via other routers.

Step 302: A mapping relationship from (S/*,G) to MFEC is configured on an ingress router. If (S,G/M) belongs to the same MFEC, when the ingress router receives a multicast data packet, the ingress route queries the multicast forwarding table item which is identified by MFEC and is established when the distribution tree or distribution sub-tree based on MFEC is constructed, and forwards the multicast data packet on corresponding outgoing-interface.

Step 303: A routing based on MFEC is created based on a principle that all the multicast data packets are forwarded in the same mode in the same MFEC. The method for creating a routing includes a dynamic creation mode and a static creation mode. The dynamic creation mode includes modifying an existing protocol and dynamically generating a distribution tree or distribution sub-tree based on MFEC via a join packet sent from a receiver host and a join packet transferred in a distribution tree or distribution sub-tree based on MFEC.

Firstly, the receiver host sends a join packet. When the egress router receives the join packet directly or via other routers, the egress router maps the join packet from (S/*,G) to MFEC, replaces the field (S,G) or (*,G) in the join packet with (S,G/M) or (*,G/M), creates a multicast routing table item and a multicast forwarding table item identified by (S,G/M) or (*,G/M), and adds an outgoing-interface which is an outgoing-interface of the multicast data packet to the multicast routing table item and the multicast forwarding table item. The multicast data packet is forwarded downstream via the outgoing-interface. For example, if (S,G/M) is a MFEC, the multicast routing table item and the multicast forwarding table item becomes (S,G/M, GE1/0/1, {GE2/0/0, GE3/0/0}), in which the GE1/0/1 is an incoming-interface of the multicast data packet and the {GE2/0/0, GE3/0/0} is an outgoing-interface, and GE refers to Gigabit Ethernet. Then, a join packet identified by MFEC is sent to an upstream router of the distribution tree or distribution sub-tree. The upstream router may be a transit router or an ingress router. If the upstream route is a transit router, the transit router further creates a multicast routing table item and a multicast forwarding table item identified by (S,G/M) or (*,G/M), adds an outgoing-interface to the multicast routing table item and the multicast forwarding table item and send a join packet to an upstream router. Finally, the ingress router receives the join packet, creates a multicast routing table item and a multicast forwarding table item identified by (S,G/M) or (*,G/M) and adds an outgoing-interface to the multicast routing table item and the multicast forwarding table item. In this way, a routing based on MFEC is established on the distribution tree or distribution sub-tree based on MFEC.

The Step 301 to Step 303 shows a process for joining a multicast group, including: sending a join packet by a receiver host and sending the join packet to an upstream node by a network node router. In fact, the process also can be considered as a process for constructing a distribution tree or distribution sub-tree based on MFEC. After the process is performed, the distribution path of the multicast data packet is determined.

The mode in which a routing based on MFEC is created statically means that multicast forwarding instruction information identified by the MFEC, i.e. a multicast routing table item and multicast forwarding table item, is statically configured on each node in the distribution tree or the distribution sub-tree, so that the forwarding of the multicast data packet is directly performed on each node by taking MFEC as minimum unit. Usually, depending on functions, nodes in a distribution tree or distribution sub-tree may be classified into: an ingress node which is an ingress of a multicast data packet on the distribution tree or distribution sub-tree, a transit node which is an intermediate node and an egress node which is an egress of a multicast data packet on the distribution tree or distribution sub-tree. However, the three types of nodes do not have to appear at the same time. For example, the transit node may not exist; or only one node exists in the distribution tree or distribution sub-tree, and thus the node can be the ingress node, the transit node and the egress node at the same time.

The difference between the multicast routing table item and the multicast forwarding table item lies in that, the multicast routing table item includes all established routing table items when the router performs a routing learning.

The multicast forwarding table item is the optimum routing among the routing table items, and is the routing table item for the router to forward a data packet. However, in the multicast protocol, the multicast routing table item is generally the same as the multicast forwarding table item.

In addition to the modes in which a routing based on MFEC is created dynamically or statically, there further exists a dynamic-static creation mode, in which a join on an interface is statically implemented on an egress router and a static join on an interface of the egress router is implemented via a command. The interface may be a virtual logic interface, rather than be limited to a physical interface. According to the method, the mapping relationship as shown in Step 301 does not need to be configured on the egress router; on the contrary, a join packet based on MFEC is directly sent to an upstream router. Although no join packet is sent from the receiver host, the method also brings about the same effect as that of the case in which the receiver host sends the join packet. In other words, the egress router is also triggered to send the join packet towards upstream side. In the embodiments of the invention, the two methods are both referred to as a triggering. The dynamic mapping mode is referred to as a protocol triggering, and the static join mode is referred to as a command triggering. But the static join mode is implemented on the egress router, and a routing is still dynamically created on the transit router and the ingress router, according to the join packet sent from the downstream router. Therefore, in general, the method is still a dynamic mapping mode.

By the Step 301 to Step 303, a distribution tree or distribution sub-tree based on MFEC is created, and the multicast routing table item and multicast forwarding table item of each node on the tree is determined. When a multicast data packet reaches an ingress router, ingress router first queries the multicast forwarding instruction information, according to the mapping relationship configured in Step 302, and forwards the multicast data packet on the outgoing-interface, according to the multicast forwarding table item identified by (S,G/M) or (*,G/M). The multicast data packet is forwarded by the transit router and the egress router of the distribution tree or distribution sub-tree, and finally reaches the receiver host.

Figure 4:
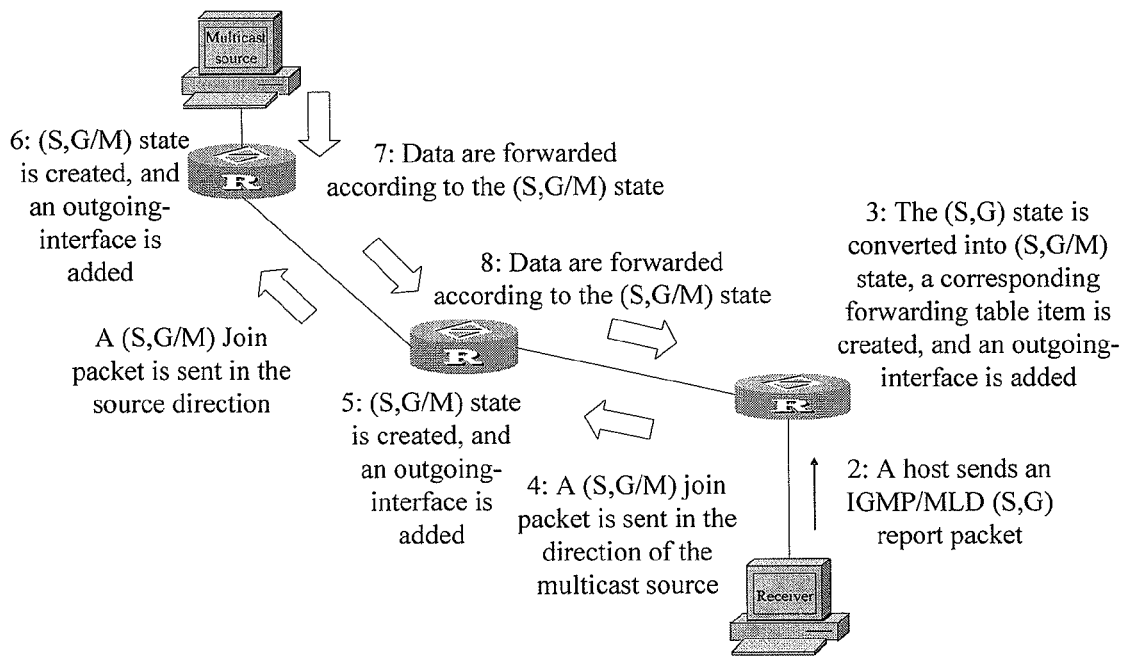
FIG. 4 is a schematic diagram showing the construction of the distribution tree based on MFEC and the forwarding of the multicast data packet in Protocol Independent Multicast (PIM SSM) protocol, according to the second embodiment of the invention.

The second embodiment of the invention shows a method for constructing a routing based on MFEC in PIM SSM of a designated source multicast and forwarding a multicast data packet according to the routing. The method is as shown in FIG. 4 and includes the following steps.

1) A mapping relationship from (*,G) or (S,G) to MFEC is configured as (*,G/M) or (S,G/M) on an egress router and an ingress router.

2) A receiver host sends an IGMP/MLD (S,G) report packet to a router nearest thereto. For example, if the receiver wants to watch a program of a channel, for example, if the receiver needs to receive a multicast data stream from (S,G), the receiver sends an IGMP/MLD (S,G) report packet to the Egress router.

3) On the Egress router, the (S,G) state is converted into (S,G/M) state, according to the mapping relationship configured in Step 1). The conversion is performed after the egress router receives a report packet. In other words, the (S,G) field in the report packet is converted into (S,G/M). Because the multicast source is S, the egress router obtains an incoming-interface of the multicast source by querying a corresponding routing table item, creates a multicast routing and forwarding table item identified by (S,G/M), and adds an outgoing-interface, which is an interface to the receiver host, to the table item.

The static join based on MFEC may also be configured on the egress router in a static mode. In other words, in the case that no report packet is received, the static join on an interface of the egress router is configured via a related command, and the egress router is triggered to send a join packet towards upstream side.

4) The egress router computes and generates a PIM join packet in (S,G/M) state, and sends the PIM join packet based on (S,G/M) in the direction of the multicast source on the incoming-interface shown in Step 3. As shown in FIG. 4, a transit router on the MFEC receives the PIM join packet.

The (S,G/M) state is created on the transit router, a corresponding routing/forwarding table item identified by (S,G/M) is established, an outgoing-interface of the multicast data packet is added to the table item, and a PIM join packet of (S,G/M) is sent in the direction of the source.

The ingress router creates (S,G/M) state, establishes a corresponding routing/forwarding table item identified by (S,G/M), and adds an outgoing-interface to the table item. If no other layer 3 network devices exist between the ingress router and the multicast source, in other words, if the ingress router is a layer 3 network device nearest to the multicast source, a data stream sent from the multicast source is forwarded on the outgoing-interface, according to the established multicast forwarding table item after the data stream reaches the ingress router.

If other routers exist between the ingress router and the multicast source, the ingress router may receive and forward a multicast data packet sent from the multicast source in the following two modes.

In the first mode, a multicast routing table item and a forwarding table item identified by (S,G/M) may be generated on a router between the ingress router and the multicast source in a mode in which the multicast routing table item and the multicast forwarding table item are configured statically, and a layer 3 network device nearest to the multicast source forwards a multicast data packet to the ingress router on the outgoing-interface by configuring the forwarding table item.

In the second mode, MFEC is further resolved into a corresponding (S,G) on the ingress router, according to the mapping relationship configured in Step 1, and a PIM join packet based on each (S,G) is respectively sent to upstream routers in a normal mode.

In fact, the method based on the first mode is a continuation of the technical solution, according to the embodiments of the invention. In the method, all the multicast group data streams of MFEC are pushed to the ingress router. The advantage of the method lies in that, problems such as delay or jitter in the multicast data packet transmission caused by the oscillation of links on the distribution tree based on MFEC can be avoided, because all the multicast data packets are pushed to the ingress router in one go and are not influenced by the internal change of the distribution tree based on MFEC. The method based on the second mode 2 is a method for saving bandwidth. In the method, the multicast data packet can be sent on demand, in other words, the multicast data packet of a multicast group is sent only when the join packet of the multicast group is received, and only (S,G) multicast data packet is transmitted on the router between the ingress router and the multicast source, according to the demand of the receiver.

7) The multicast source issues a multicast data packet. After the multicast data packet reaches the ingress router, the ingress router queries the multicast forwarding table item identified by MFEC, according to the mapping relationship and forwards the multicast data packet on the outgoing-interface, according to an established forwarding table item identified by (S,G/M).

8) The transit router receives the multicast data packet, and forwards the multicast data packet in downstream on the outgoing-interface, according to an established forwarding table item identified by (S,G/M), until the multicast data packet is forwarded to the egress router. Similarly, the egress router forwards the multicast data packet to the receiver, according to an established forwarding table item identified by (S,G/M).

This embodiment is applicable to the case of the multicast source, in which a mapping relationship between the multicast data packet and the MFEC is preconfigured on the egress router and the Ingress router. When the egress router obtains a request from a user for joining a multicast group, the egress router directly establishes a multicast routing table item and a forwarding table item based on MFEC. When the user wants to receive other channel programs of the same MFEC, the mapping relationship and the routing/forwarding table item does not need to be modified, so that the memory space of the router and the routing switching time are saved.

Figure 5:
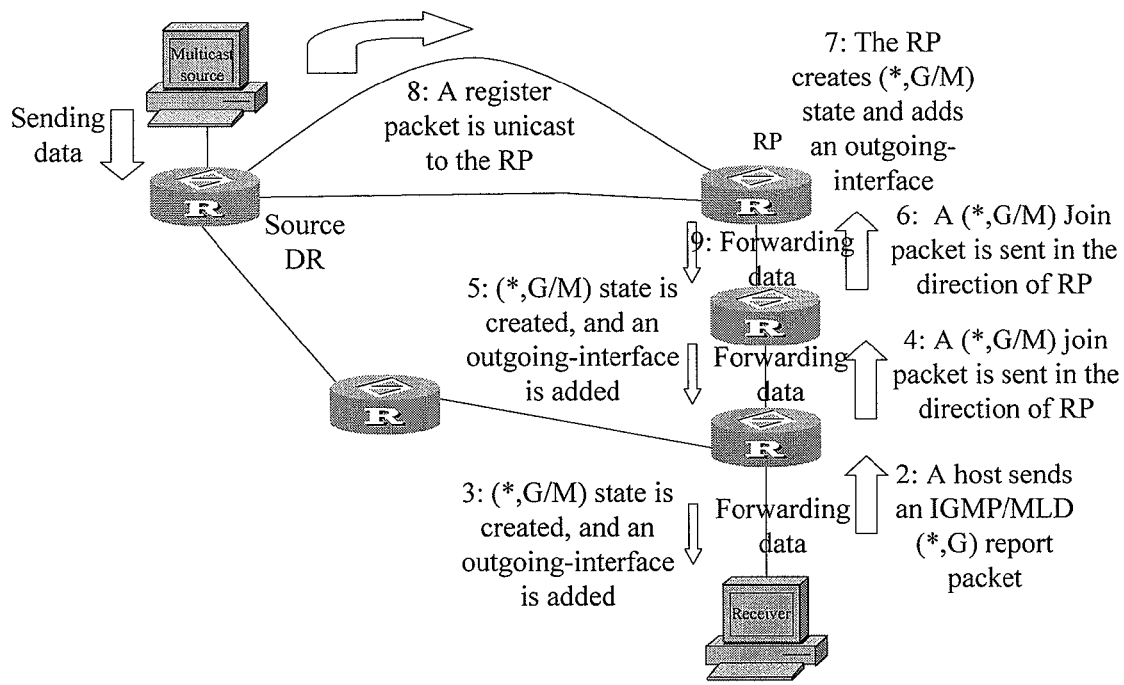
FIG. 5 is a schematic diagram showing the construction of the shared tree based on MFEC and the forwarding of the multicast data packet in Protocol Independent Multicast-Sparse Mode (PIM SM) protocol, according to the third embodiment of the invention.

The third embodiment of the invention shows a method for constructing a shared tree based on MFEC and forwarding a multicast data packet in PIM SM. he construction mode is as shown in FIG. 5, and includes the following steps.

1) A mapping relationship from (*,G) or (S,G) to MFEC is preconfigured as (*,G/M) or (S,G/M) on an egress router and an ingress router.

2) A receiver host sends an IGMP/MLD (*,G) report packet to the egress router. For example, if the receiver wants to watch a program of a channel and only knows the address of the multicast group, in other words, if the receiver wants to receive a multicast data packet from (*,G), the receiver sends an IGMP/MLD (*,G) report packet to the egress router.

3) The egress router converts the (*,G) field in the IGMP/MLD (*,G) report packet into (*,G/M) field, according to the MFEC mapping relationship configured in Step 1, establishes a multicast routing and forwarding table item identified by (S,G/M), and adds an outgoing-interface to the table item. Alternatively, the egress router configures IGMP/MLD static join (*,G/M) in a static configuration mode. Thereby, the PIM SM is triggered to construct a distribution tree.

The shared tree rendezvous points (RP) of the (*,G) on MFEC are the same; otherwise they cannot be aggregated into (*,G/M) state, because according to an existing protocol, the join packet generated on a router can only be sent to the same RP. If the join packet corresponds to a plurality of RPs in MFEC, a (*,G/M) join packet which can only be sent to one RP, is generated on the egress router, and thus some multicast sources cannot be found by the RP.

4) The egress router computes and generates a PIM join packet based on (*,G/M) and sends a (*,G/M) PIM join packet in the direction of RP.

5) A multicast routing/forwarding table item identified by (*,G/M) is created on the transit router, and an outgoing-interface is added to the table item.

6) The transit router computes and generates a PIM join packet based on (*,G/M), and sends a PIM join packet based on (*,G/M) in the direction of RP.

7) A multicast routing/forwarding table item identified by (*,G/M) is created on the RP router, and an outgoing-interface is added to the table item.

8) A source designated router (DR) unicasts a register packet to the RP. The source DR is a layer 3 network node nearest to the multicast source, and the multicast data packets from the multicast source are continuously sent to the source DR. However, the source DR will not forward the data packet until the source DR receives a request for joining the multicast group. The unicast action is not limited to be performed in this step; in fact, the register packet of the source DR may be sent periodically to the RP so as to make the RP obtain the existence of the multicast source. The RP is adapted to connect the receiver host with the multicast source, and a data packet can also be received from the multicast source via the RP.

If the source DR is an ingress router, the multicast source (S,G) is turned to the (S,G/M) state according to the MFEC mapping relationship, and a register packet based on (S,G/M) is unicast to the RP. If the RP is an ingress router, after the RP of the invention receives a (S,G) register packet, the RP converts the (S,G) in the register packet into (S,G/M) state, according to a MFEC mapping table.

The source DR receives a multicast data packet sent from the multicast source, forwards the multicast data packet in downstream on the outgoing-interface, and sends the multicast data packet to the receiver host via the transit router and egress router.

Figure 6:
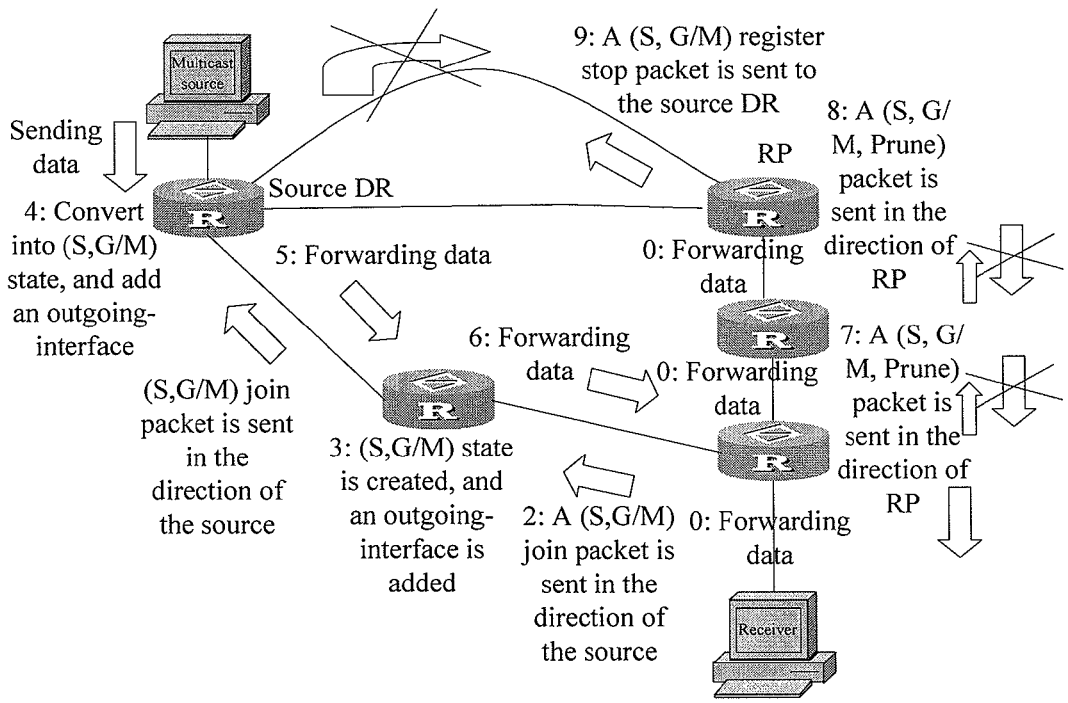
FIG. 6 is a schematic diagram showing the switching from RPT to SPT and the forwarding of the multicast data packet in PIM SM protocol, according to the fourth embodiment of the invention.

This embodiment shows a method for constructing a shared tree and forwarding a multicast data packet in the case that the receiver does not designate the multicast source. In the above method, the multicast group in which the receiver wants to join needs to be connected with the multicast source via a RP. The path on which a multicast data packet is forwarded via the RP is referred to as a shared tree (RPT). Because the RPT may not be the optimum path from the receiver to the multicast source and the load on the RPT may be large since the RPT generally forwards request services for a plurality of (*,G), the protocol prescribes that the traffic on the RPT shall be switched to the optimum path when a triggering condition is satisfied, in other words, the traffic on the RPT is switched to the shortest path tree (SPT) between the receiver and the multicast source. The SPT is generally referred to as a source tree. The triggering condition of switching is configured by the user. Generally, the triggering condition may be that the traffic of the downlink multicast data packet received by the egress router is greater than 0 or greater than a rate, for example, 1 Mbit/s. The fourth embodiment of the invention describes the switching process. The process is as shown in FIG. 6, and includes the following steps.

1) A mapping relationship from (*,G) or (S,G) to MFEC is preconfigured as (*,G/M) or (S,G/M) on an egress router and an ingress router.

2) A multicast data packet is originally forwarded along RPT. The egress router in FIG. 6 which is directly connected with the receiver host initiates a SPT switching, performs a computation and sends a PIM join packet, based on (S,G/M) in the direction of the multicast source.

3) A multicast routing/forwarding table item identified by (S,G/M) is created on the transit router, an outgoing-interface is added to the table item, a PIM join packet based on (S,G/M) is computed and generated, and the PIM join packet is sent in the direction of the source.

4) If the source DR is an ingress router, a (S,G/M) mapping relationship exists on the source DR according to step 1 and a multicast routing/forwarding table item identified by (S,G/M) is created and an outgoing-interface is added to the multicast routing/forwarding table item. If the source DR is not the ingress router, the source DR may be directly connected with the ingress router or other routers may also exist therebetween. Thus, two methods are provided as follows.

The first method: A multicast forwarding table item and a multicast routing table item based on MFEC may be statically configured on a router between the source DR router and the ingress router, a (S,G/M) routing table item and forwarding table item may be generated, and the ingress router forwards a data packet to the source DR router through the configuration.

The second method: The ingress router resolves the MFEC into a plurality of (S,G), according to the mapping relationship in step 1, and sends the PIM join packet of each (S,G) in the direction of the multicast source.

5) The source DR receives a multicast data packet sent from the multicast source and forwards the multicast data packet in downstream on the outgoing-interface.

6) The transit router receives the multicast data packet and forwards the multicast data packet in downstream along the SPT.

7) The last hop router directly connected with the receiver receives the multicast data packet from the upstream side of the SPT and initiates a pruning process. Because the multicast data packet is received via the SPT, the RPT needs to be deleted. Thus, a prune packet based on (S,G/M) is computed and sent in the direction of RP.

8) The transit router on the RPT prunes the outgoing-interface of (S,G/M) and sends a prune packet based on (S,G/M) in the direction of RP.

9) The RP prunes the outgoing-interface of (S,G/M) and sends a register stop packet for (S,G/M) to the source DR, the source DR prunes the register outgoing-interface of (S,G/M), and do not forward the data packet along the RPT.

The second to the fourth embodiments employ the dynamic application mode of MFEC. In other words, with the triggering condition that the multicast protocol packet, such as IGMP/MLD report/PIM, is received, according to a pre-configured MFEC mapping relationship, the multicast (S/*, G) state is converted into a corresponding MFEC state, and the multicast routing protocol is caused to construct a multicast distribution tree, based on MFEC. Optionally, the static application mode may also be employed. A static join based on MFEC is directly defined, a multicast distribution tree based on MFEC is created, and a MFEC routing item and forwarding item is defined on the router so as to directly instruct the forwarding of the data packet. Optionally, an active incoming-interface and a stand-by incoming-interface may be configured for each MFEC state so as to improve the robustness of multicast forwarding. Moreover, the dynamic mode and the static mode may also be combined, and the dynamic mode is used on part of the network nodes while the static mode is used on other part of the network nodes. For example, the static mode is used on the egress router and the dynamic mode is used on other routers.

Figure 7:
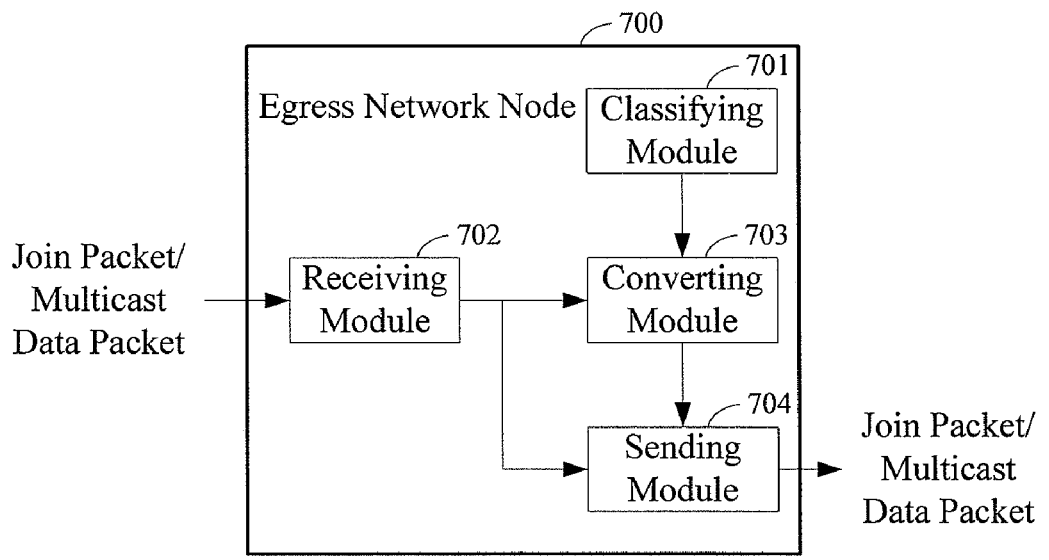
FIG. 7 is a structural diagram of a multicast system, according to one embodiment of the invention.

One embodiment of the invention further provides an egress network node. FIG. 7 is a structural diagram of the egress network node, according to the embodiment of the invention. As shown in FIG. 7, the egress network node 700 according to the embodiment of the invention includes: a classifying module 701, receiving module 702, a converting module 703, and a sending module 704.

The classifying module 701 is adapted to classify a collection of multicast data packets forwarded in the same mode into a MFEC, and configure a mapping relationship between the multicast data packets of the same MFEC and the MFEC.

The receiving module 702 is adapted to output a join packet received to the converting module 703 and output the multicast data packets received to the sending module 704.

The converting module 703 is adapted to map the join packet received into a join packet based on the MFEC, according to the mapping relationship obtained from the classifying module 701, establish forwarding instruction information identified by the MFEC, and output the join packet mapped and the forwarding instruction information to the sending module 704.

The sending module 704 is adapted to send a received join packet which is mapped to an upstream network node, and send the multicast data packets received to a downstream network node, according to the forwarding instruction information.

The converting module 703 is further adapted to add an outgoing-interface in the forwarding instruction information. The sending of the multicast data packets received to the downstream network node according to the forwarding instruction information includes: sending the multicast data packets received to the downstream network node, according to the outgoing-interface in the forwarding instruction information.

Figure 8:
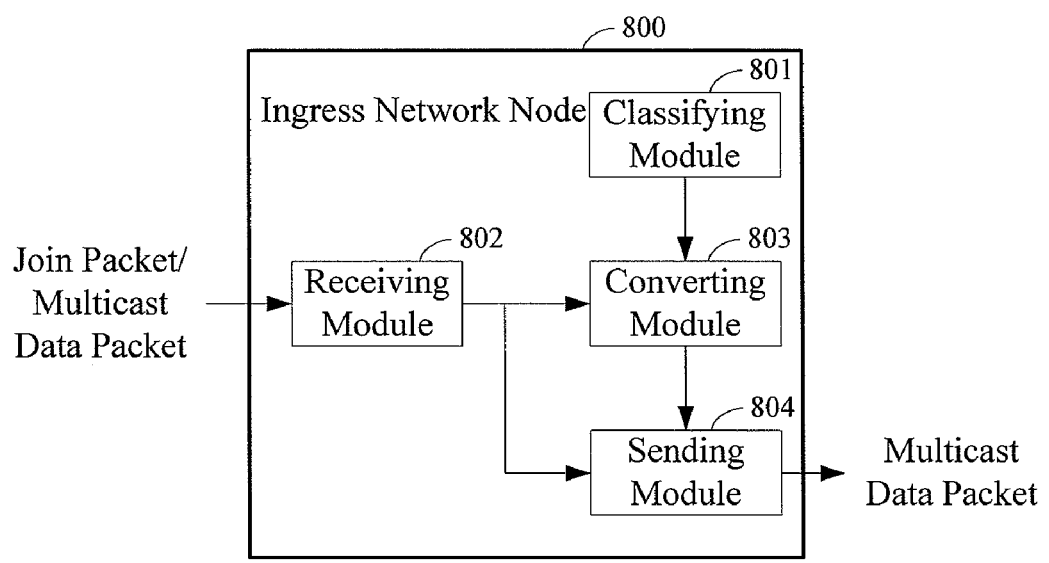
FIG. 8 is a structural diagram of an egress network node, according to one embodiment of the invention.

Another embodiment of the invention further provides an ingress network node. FIG. 8 is a structural diagram of the egress network node, according to the embodiment of the invention. As shown in FIG. 8, the ingress network node 800 according to the embodiment of the invention includes: a classifying module 801, a receiving module 802, a converting module 803, and a sending module 804.

The classifying module 801 is adapted to classify a collection of multicast data packets forwarded in the same mode into a MFEC, and configure a mapping relationship between the multicast data packets of the same MFEC and the MFEC.

The receiving module 802 is adapted to output a join packet received to the converting module 803 and output the multicast data packets received to the sending module 804.

The converting module is adapted to establish forwarding instruction information identified by the MFEC, according to the join packet received and the mapping relationship obtained from the classifying module, and output the forwarding instruction information to the sending module.

The sending module 804 is adapted to send the multicast data packets received to a downstream network node, according to the forwarding instruction information.

The converting module 803 is further adapted to add an outgoing-interface in the forwarding instruction information; and sending the multicast data packets received to the downstream network node according to the forwarding instruction information includes: sending the multicast data packets received to the downstream network node, according to the outgoing-interface in the forwarding instruction information.

In conclusion, in the embodiments of the invention, because the same multicast forwarding table items are used for data packets which pass through the same distribution tree or sub-tree and are referred to as MFEC, and the data packets of the same MFEC are forwarded using the same multicast forwarding table item, the routing convergence time may be reduced, the space occupation may be lowered, and the space and time efficiency may be improved. Moreover, the single (S,G) or (*,G) is not used as the minimum unit of a protocol packet. Instead, the protocol packet is based on MFEC, and therefore the efficiency of state processing and packet interaction is improved.

What is claimed is:

1. A multicast method, comprising joining a multicast group and forwarding a multicast data packet, the method further comprising:
 during the joining of the multicast group, sending a join packet based on a Multicast Forwarding Equivalence Class (MFEC) and establishing multicast forwarding instruction information identified by the MFEC, on a network node of a distribution tree or a distribution sub-tree to which the MFEC pertains, wherein multicast data packets passing through the same multicast distribution tree or distribution sub-tree are classified into the MFEC, and multicast data packets from more than one specific multicast stream are classified into the MFEC; and during the forwarding of the multicast data packet, forwarding the multicast data packet according to the multicast forwarding instruction information identified by the MFEC, wherein the multicast data packet is classified into the MFEC, and the forwarding of multicast data packets within the same MFEC comprises forwarding multicast data packets using the same forwarding process through the same multicast distribution tree or distribution sub-tree;

configuring, on an egress network node and an ingress network node of the distribution tree or the distribution sub-tree, a mapping relation between the multicast data packets of the same MFEC and the MFEC, and determining the multicast data packet contained in the MFEC;

receiving, by the egress network node, the join packet of a receiver host or the join packet of the downstream network node which belong to the multicast data packets of the same MFEC, mapping the join packets for joining different multicast groups into packets based on the MFEC according to the mapping relation, creating multicast forwarding instruction information identified by the MFEC, and adding an outgoing-interface to the multicast forwarding instruction information.

2. The multicast method according to claim 1, wherein, the establishing of the multicast forwarding instruction information identified by the MFEC comprises:

after the egress network node of the distribution tree or the distribution sub-tree to which the MFEC pertains receives a triggering, sending, by the egress network node, the join packet based on the MFEC to an upstream network node of the distribution tree or the distribution sub-tree, establishing, by the egress network node, the multicast forwarding instruction information identified by the MFEC and adding the outgoing-interface into the multicast forwarding instruction information; and establishing, by the upstream network node, the multicast forwarding instruction information identified by the MFEC, adding the outgoing-interface to the multicast forwarding instruction information and further sending the join packet to an upstream side of the upstream network node.

3. The multicast method according to claim 2, further comprising:

after the ingress network node receives the join packet from a downstream network node, establishing, by the ingress network node, the multicast forwarding instruction information identified by the MFEC and adding the outgoing-interface to the multicast forwarding instruction information.

4. The multicast method according to claim 2, wherein, the receiving of the triggering comprises:

configuring a static join on an interface, and creating multicast forwarding instruction information identifying the MFEC.

5. The multicast method according to claim 1, wherein, the mapping of the join packets for joining different multicast groups into the packets based on the MFEC comprises:

replacing a multicast group address pair field for indicating that the multicast data packets belong to the same MFEC with a field for indicating the MFEC, in the join packets, according to the mapping relation between the multicast data packets of the same MFEC and the MFEC; or, adding the field for indicating the MFEC in the join packets according to the mapping relation between the multicast data packet and the MFEC, and broadcasting a correspondence between the multicast group address pair and the MFEC over the network, or configuring the correspondence via a command.

6. The multicast method according to claim 1, further comprising:

if another network node exists between the ingress network node of the distribution tree or the distribution sub-tree and a multicast source, configuring the multicast forwarding instruction information identified by the MFEC on the network node between the ingress network node and the multicast source, generating a corresponding routing table item and forwarding table item and sending the join packet in the direction of the multicast source via such a configuration.

7. The multicast method according to claim 1, further comprising:

if another network node exists between the ingress network node of the distribution tree or the distribution sub-tree and the multicast source, resolving, by the ingress network node, the join packet based on the MFEC into the join packet of the multicast data packet contained in the MFEC according to the mapping relation and sending the join packet resolved to a router in an upstream side of the ingress network node.

8. The multicast method according to claim 1, wherein, the forwarding of the multicast data packet comprises:

after the ingress network node receives the multicast data packets belonging to the same MFEC, querying the multicast forwarding instruction information according to the mapping relation and forwarding the multicast data packet to a downstream node on a corresponding outgoing-interface; and receiving, by the egress network node, the multicast data packet, querying the multicast forwarding instruction information, and forwarding the multicast data packet on the corresponding outgoing-interface.

9. The multicast method according to claim 8, further comprising:

receiving, by a transit network node, the multicast data packet sent by the ingress network node, querying the multicast forwarding instruction information according to the field for indicating the MFEC, and forwarding the multicast data packet to the egress network node on the corresponding outgoing-interface.

10. The multicast method according to claim 8, comprising, if another network node exists between the egress network node and the receiver host, configuring the multicast forwarding instruction information identified by the MFEC on the network node between the egress network node and the receiver host, generating the corresponding routing table item and forwarding table item and forwarding the multicast data packet in the direction of the receiver host via such a configuration; or, querying the multicast forwarding instruction information identified by an address pair of the multicast data packet on the network node between the egress network node and the receiver host and forwarding the multicast data packet to the downstream network node.

11. An egress network node, comprising: a classifying module, a receiving module, a converting module and a sending module; wherein the classifying module classifies a collection of multicast data packets forwarded in the same mode into a Multicast Forwarding Equivalence Class, MFEC, and configure a mapping relation between the multicast data packets of the same MFEC and the MFEC, wherein multicast data packets passing through the same multicast distribution tree or distribution sub-tree are classified into the MFEC, and multicast data packets from more than one specific multicast stream are classified into the MFEC;

the receiving module outputs a join packet received to the converting module and output the multicast data packets received to the sending module;

the converting module maps the join packet received into a join packet based on the MFEC according to the mapping relation obtained from the classifying module, establish forwarding instruction information identified by the MFEC, and output the join packet mapped and the forwarding instruction information to the sending module; and the sending module sends the join packet based on the MFEC to an upstream network node, and send the multicast data packets received to a downstream network node according to the forwarding instruction information; wherein the forwarding of the multicast data packets in the same mode comprises performing the same forwarding process on the multicast data packets passing through the same multicast distribution tree or the distribution sub-tree;

wherein the converting module is further configured to map the join packets for joining different multicast groups into packets based on the MFEC according to the mapping relation, create multicast forwarding instruction information identified by the MFEC, and add the outgoing-interface to the multicast forwarding instruction information.

12. The egress network node according to claim 11, wherein:

the sending module comprises: sending the multicast data packets received to the downstream network node according to the outgoing-interface in the forwarding instruction information.

13. An ingress network node, comprising: a classifying module, a receiving module, a converting module and a sending module; wherein the classifying module classifies a collection of multicast data packets forwarded in the same mode into a Multicast Forwarding Equivalence Class, MFEC, and configure a mapping relation between the multicast data packets of the same MFEC and the MFEC, wherein multicast data packets passing through the same multicast distribution tree or distribution sub-tree are classified into the MFEC, and multicast data packets from more than one specific multicast stream are classified into the MFEC;

the receiving module outputs a join packet received to the converting module and output the multicast data packets received to the sending module;

the converting module establishes forwarding instruction information identified by the MFEC according to the join packet received and the mapping relation obtained from the classifying module, and output the forwarding instruction information to the sending module; and the sending module sends the multicast data packets received to a downstream network node according to the forwarding instruction information; wherein the forwarding of the multicast data packets in the same mode comprises performing the same forwarding process on the multicast data packets passing through the same multicast distribution tree or the distribution sub-tree;

wherein the converting module further adds an outgoing-interface in the forwarding instruction information.

14. The ingress network node according to claim 13, wherein:

the sending module comprises: sending the multicast data packets received to the downstream network node according to the outgoing-interface in the forwarding instruction information.

* * * * *